United States Patent
Ratoff et al.

(10) Patent No.: US 6,760,152 B2
(45) Date of Patent: Jul. 6, 2004

(54) METHOD FOR INCREASING DYNAMIC RANGE OF ERBIUM DOPED FIBER AMPLIFIERS

(75) Inventors: Daniel Ratoff, San Jose, CA (US); Paul Nathan Freeman, Saratoga, CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 10/269,925

(22) Filed: Oct. 11, 2002

(65) Prior Publication Data

US 2003/0128420 A1 Jul. 10, 2003

Related U.S. Application Data

(60) Provisional application No. 60/328,744, filed on Oct. 12, 2001.

(51) Int. Cl.[7] ................................................. H01S 3/00
(52) U.S. Cl. ............................... 359/341.3; 359/341.31
(58) Field of Search ......................... 359/341.3, 341.31

(56) References Cited

U.S. PATENT DOCUMENTS

| | | | | |
|---|---|---|---|---|
| 5,479,424 A | * | 12/1995 | Sakuyama | 372/26 |
| 5,907,420 A | | 5/1999 | Chraplyvy et al. | 359/179 |
| 5,966,236 A | * | 10/1999 | Okuno | 359/337 |
| 6,433,926 B2 | * | 8/2002 | Pedersen et al. | 359/341.43 |
| 6,456,408 B1 | | 9/2002 | Moeller | 359/124 |
| 6,658,211 B1 | * | 12/2003 | Yokoyama | 398/79 |

FOREIGN PATENT DOCUMENTS

EP 1 079 481 2/2001 ........... H01S/3/067

* cited by examiner

Primary Examiner—Mark Hellner
(74) Attorney, Agent, or Firm—Allen, Dyer, Doppelt, Milbrath & Gilchrist, P.A.

(57) ABSTRACT

The present application relates to a doped fiber amplifier having an increased dynamic range, and particularly for laser pump sources and a method of pumping erbium doped fiber amplifiers over a greater dynamic range. In a multi-channel optical system, optical amplifiers must be able to provide gain over a larger range of signal powers, the dynamic range corresponding to the number of channels in the link. The present invention has found that the dynamic range of an EDFA can be significantly increased by using pulse width modulation to pulse pump current at or near the minimum current stability threshold, in order to produce lower power output. The duty cycle of the pulsed current is selected to achieve a time-averaged operating condition taking advantage of the relatively long relaxation time of the erbium. Thus the time averaged pump power can be reduced in a linear fashion well below the capability of a continuous wave system.

5 Claims, 8 Drawing Sheets

METHOD FOR INCREASING DYNAMIC RANGE OF ERBIUM DOPED FIBER AMPLIFIERS

CROSS-REFERENCE TO RELATED APPLICATIONS

This application claims priority from U.S. provisional application No. 60/328,744 filed Oct. 12, 2001.

MICROFICHE APPENDIX

Not Applicable.

TECHNICAL FIELD

The present application relates to a doped fiber amplifier having an increased dynamic range, and particularly for laser pump sources and a method of pumping erbium doped fiber amplifiers over a greater dynamic range.

BACKGROUND OF THE INVENTION

Optical networks increasingly use wavelength division multiplexing (WDM) as a method to increase bandwidth. Multiple optical channels are combined and transmitted simultaneously as a single multiplexed signal. At the receiving end a demultiplexer separates the channels by wavelength and routes individual channels.

Optical amplifiers are commonly used in optical communication systems as in-line amplifiers for boosting signal levels to compensate for losses in a transmission link. In WDM systems, optical amplifiers are particularly useful because of their ability to amplify many optical channels simultaneously. Rare earth doped fiber optical amplifiers, such as erbium doped fiber amplifiers (EDFA) are used extensively. In addition other dopants can also be used to absorb pump energy to cause a population inversion.

In network operation, signals are periodically added or dropped for switching and routing. The number of channels, and hence the optical power of a signal may also vary due to network reconfigurations, failures or recovery from failures. In order to maintain a constant output power for each channel, the gain of the amplifier must vary with the signal power. In response to adding and dropping of signals, in particular, the signal power varies in a step function, with rapid, sometimes large changes. In order to maintain constant gain for each remaining channel, the pump power to the amplifier must be adjusted accordingly. Otherwise, with each dropped channel, the gain in the remaining channels will increase EDFAs designed for use in WDM systems are expected to have dynamically adjustable output power levels to support the adding and dropping of wavelengths while still maintaining a constant gain and output power for each wavelength. For example, a 20 dBm (100 mW) EDFA amplifying 80 different optical wavelengths will provide an output power of 1.0 dBm (1.25 mW) for each wavelength. In a dynamic network, the EDFA is expected to keep the power per channel constant when wavelengths are added and dropped. In the extreme case, where only a single channel remains, the EDFA must reduce its output to only 1 dBm. This is a dynamic range of 19 dB.

However, pump sources for EDFAs do not have such a large dynamic range. A 980 nm semiconductor pump source has a dynamic range of 7 to 10 dB. Standard JDSU/SDLO 980 pump modules are only guaranteed to operate down to 20% of operating current $I_{OP}$ to provide stable output power. Below this power level grating stabilization of the lasing wavelength may not occur, or may become unstable, causing wavelength and power fluctuation. This represents a dynamic range of 7 dB. Furthermore, even if the output power were stable down to the 1.2% $I_{OP}$ required by the 80 channel system, the pump laser would be operating very close to the lasing threshold. This is in general an unstable operating point, as the lasing threshold is highly dependent on chip temperature.

It is highly desirable to provide an amplifier that can provide stable gain over a broad dynamic range of signal intensity for WDM systems.

It is also desired to provide a pump laser source for EDFAs which can provide stable output at very low power levels.

It is further desired to provide a pump laser source for EDFAs which has a broad range of output power.

SUMMARY OF THE INVENTION

The present invention has found that the dynamic range of an EDFA can be significantly increased by using pulse width modulation to pulse pump current at or near the minimum current stability threshold, in order to produce lower power output. The duty cycle of the pulsed current is selected to achieve a time-averaged operating condition. Thus the time averaged pump power can be reduced in a linear fashion well below the capability of a continuous wave system.

Accordingly, the present invention provides

Thus an aspect of the present invention provides

In embodiments of the invention,

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
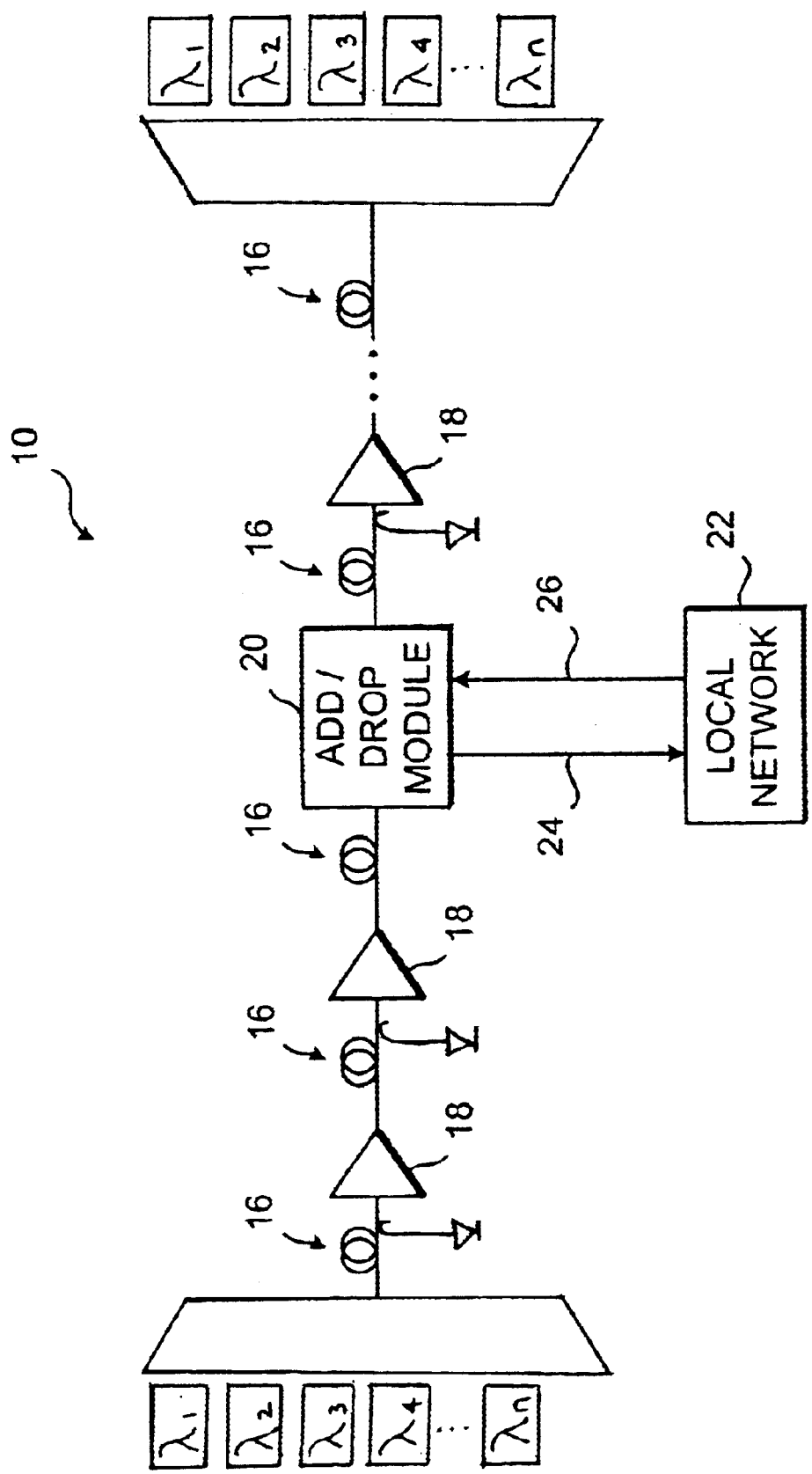
FIG. 1 is a schematic illustration of an optical communications link.

A communications link 10 is shown schematically in FIG. 1. A transmitter comprising a plurality of laser diodes each of which transmits at a channel operating at a different wavelength, transmits information on all the channels to a receiver 14 over a series of fiber links. Each fiber link includes a span 16 of optical fiber. As optical signals travel along the optical fibers 16, signal strength is attenuated. Optical amplifiers 18 are therefore used to amplify the optical signals between successive spans of fiber.

If one of the laser diodes of the transmitter 12 is taken out of service or if new channels are added, the number of wavelengths being transmitted across link 10 will change abruptly. The number of channels being carried by link 10 may also change due to unexpected system failures, such as fiber cuts. Link 10 also includes add/drop modules 20. Module 20 is used to separate channels at certain wavelengths from the main fiber path to connect to a local network 22 over a fiber link 24. Communications traffic from the local network 22 can also be provided to module 20 over fiber link 26. If link 26 is cut accidentally or if the network is reconfigured so that a different number of channels are provided over the fiber span fed by module 20, the number of channels carried by link 10 following the add/drop module 20 will change abruptly.

Figure 2:
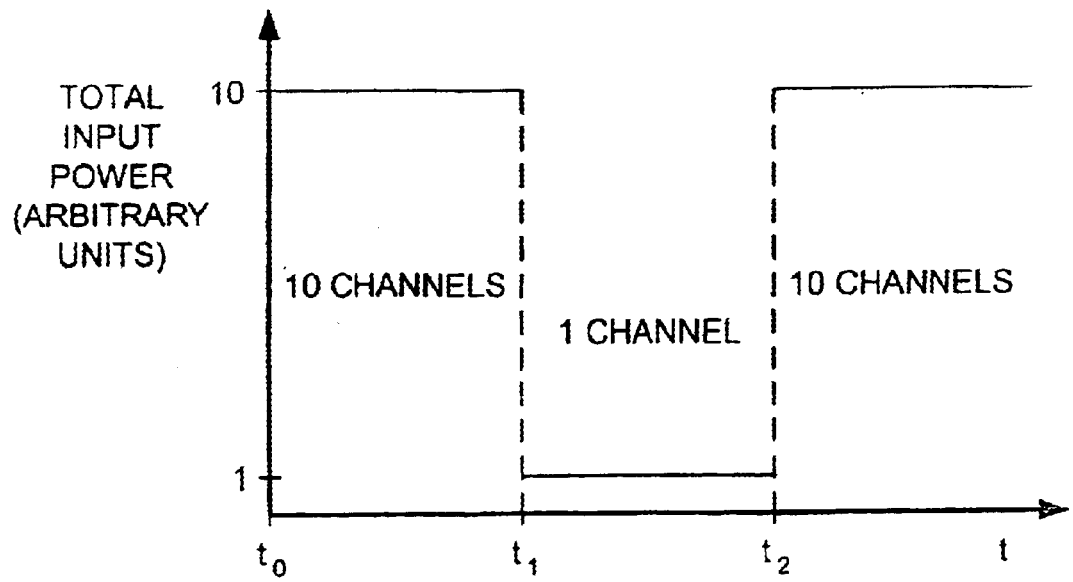
FIG. 2 is a representative graph of total signal power over time

A graph in FIG. 2 shows how the total signal power carried by a fiber in a link 10 may vary under transient conditions. In the example of FIG. 2, the fiber link is initially carrying ten signal channels. The total input power at a given amplifier 18 of link 10 is therefore relatively constant between time $t_0$ and $t_1$. At time $t_1$, nine of the original channels are dropped. As a result, the total power applied to the input of the amplifier 18 drops to one tenth of its original level. At time $t_2$, the nine dropped channels are restored, so that the system is again handling ten channels. The total input power to the amplifier therefore increases abruptly.

Figure 3:
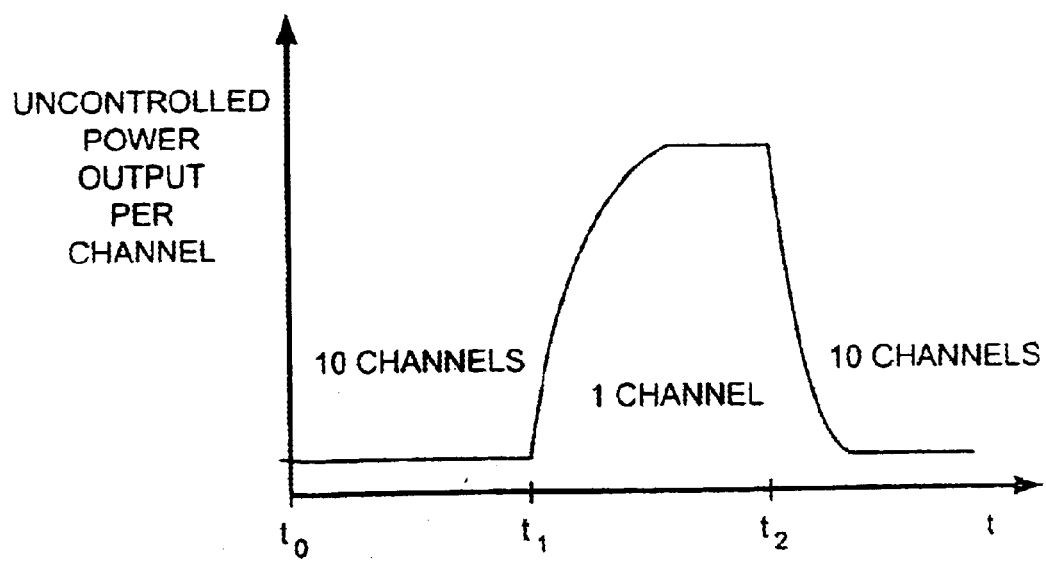
FIG. 3 is a representative graph of gain excursion in response to the signal dynamics of FIG. 2.

An erbium doped fiber amplifier with a constant pump level will not produce a well controlled output signal in response to such large variations in the input signal level. The output power per channel from an amplifier without transient control, when the amplifier receives an input signal of the type shown in FIG. 2, is shown in FIG. 3. At $t_1$, when 9 channels are dropped, the output power for the surviving channel begins to rise, because the pump power, which has not changed, is too large. The overly large pump power builds up an excessive level of inversion in the optical fiber, which significantly increases the gain experienced by the surviving channel. As a rough approximation, the gain for the surviving channel increases to 10 times its previous value. This causes the amplifier output power for the surviving channel to increase to approximately 10 times its original level. An amplifier with gain fluctuations of this type is generally unacceptable, because the output power in each channel varies too much under different input conditions.

Amplifiers use feedback by tapping the signal traffic on the link, monitoring the power levels and providing feedback to the pump controller. Signal power levels may be sampled at input and output to the amplifier. Alternatively, feedforward schemes are also implemented, which sample input power to the amplifier, anticipating an output gain, and provide changing input levels to a pump controller. The object in both configurations is to maintain constant gain across all channels in the link.

As discussed above EDFAs designed for use in WDM systems are expected to have dynamically adjustable output power levels of, for example 19 dB range, to support the adding and dropping of wavelengths while still maintaining a constant gain and output power for each wavelength. However, a 980 nm semiconductor pump source has a dynamic range of 7 to 10 dB. Standard JDSU/SDLO 980 grating stabilized pump modules operating in coherence-collapse are only guaranteed to operate down to 20% of operating current $I_{OP}$ to provide stable output power. Below this power level grating stabilization of the lasing wavelength may not occur, or may become unstable, causing wavelength and power fluctuation. This represents a dynamic range of 7 dB.

The present invention has found that the dynamic range of the EDFA can be significantly increased by implementing pulse width modulation (PWM) at the Imin current to obtain time averaged pump power well below the stability threshold of continuous wave operation. This method relies on the slow response time of the erbium inversion level in the EDFA when operated at low power levels. Other amplifier dopants also demonstrate slow decay rates suitable for use in the present invention. The gain medium has a comparatively long excited state lifetime or relaxation time. Pulse width modulation (PWM) takes advantage of this to produce relatively stable gain at low power.

Figure 4:
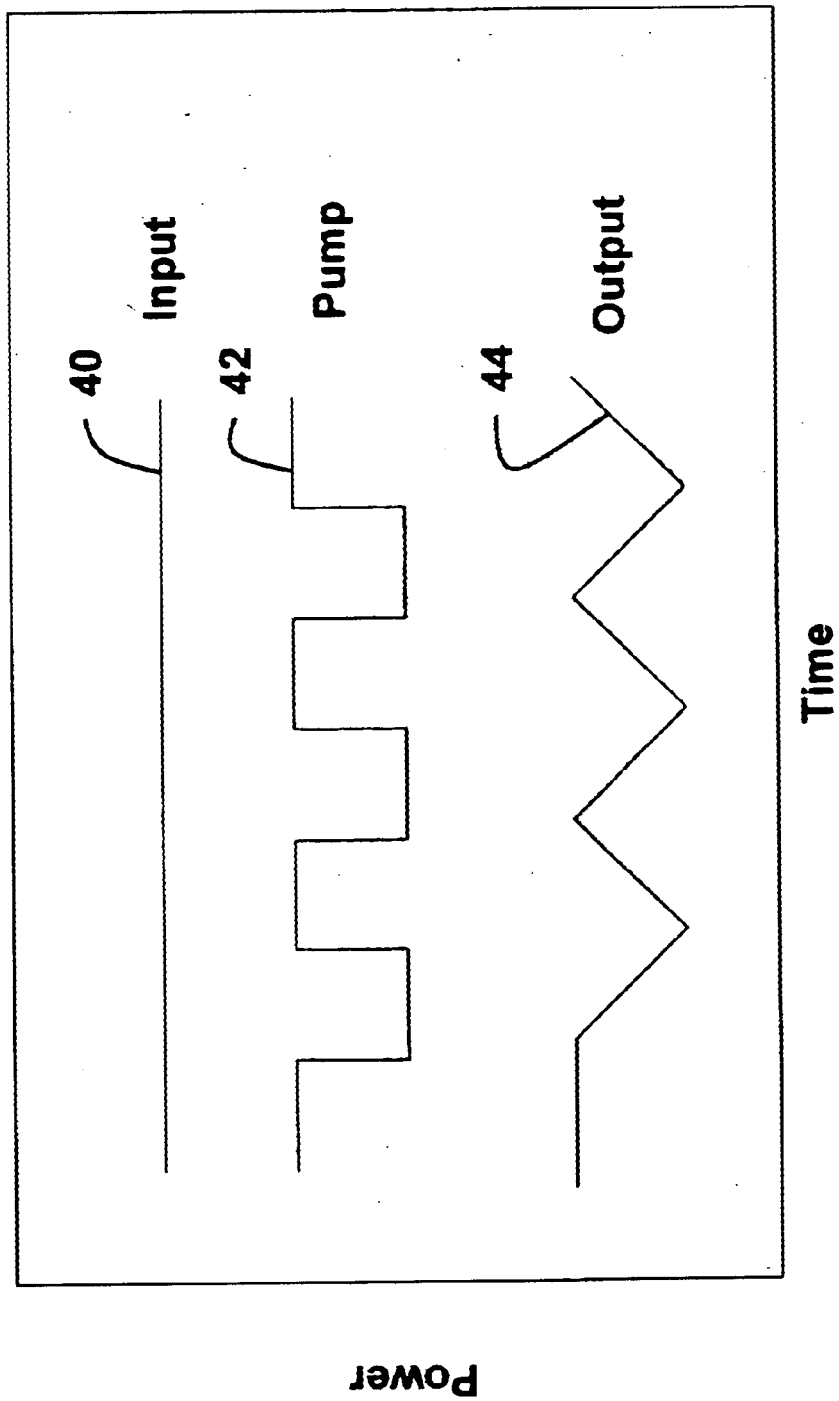
FIG. 4 is a schematic representation of an amplifier signal input and output in response to a pulsed pump source.

FIG. 4 shows a time plot of input, pump and output powers in an active erbium doped fiber with a pulsing pump source. A constant input signal 40 and a pulsed pump signal 42 produce an output power on the signal having deviations inversely related to the pulsing frequency. Experiments have shown that when operated at low power levels, the optical gain in an EDFA responds slowly to changes in optical pump power. As long as the output power is low (less than 10 dBm) and the pulse frequency is high (greater than 10–200 kHz), ripple in the output power can be kept well below 0.1 dB and the output can be considered to be continuous wave. Since the modulation frequency is relatively low, simple electronic circuitry can be used to effect the modulation of the drive current to the laser diode.

The increase in dynamic range of the pump source is dependant on the PWM method incorporated. Assuming a simple 32 step digital PWM implementations using CPLD logic, the dynamic range will be improved from 7 dB to 22 dB when compared to the 20% limit Imin discussed above. Assuming a 1 MHz drive frequency, this 32 step system would operate with pulse frequency of 31 kHz, which is sufficient for achieving output ripple less than 0.1 dB.

Figure 5A:
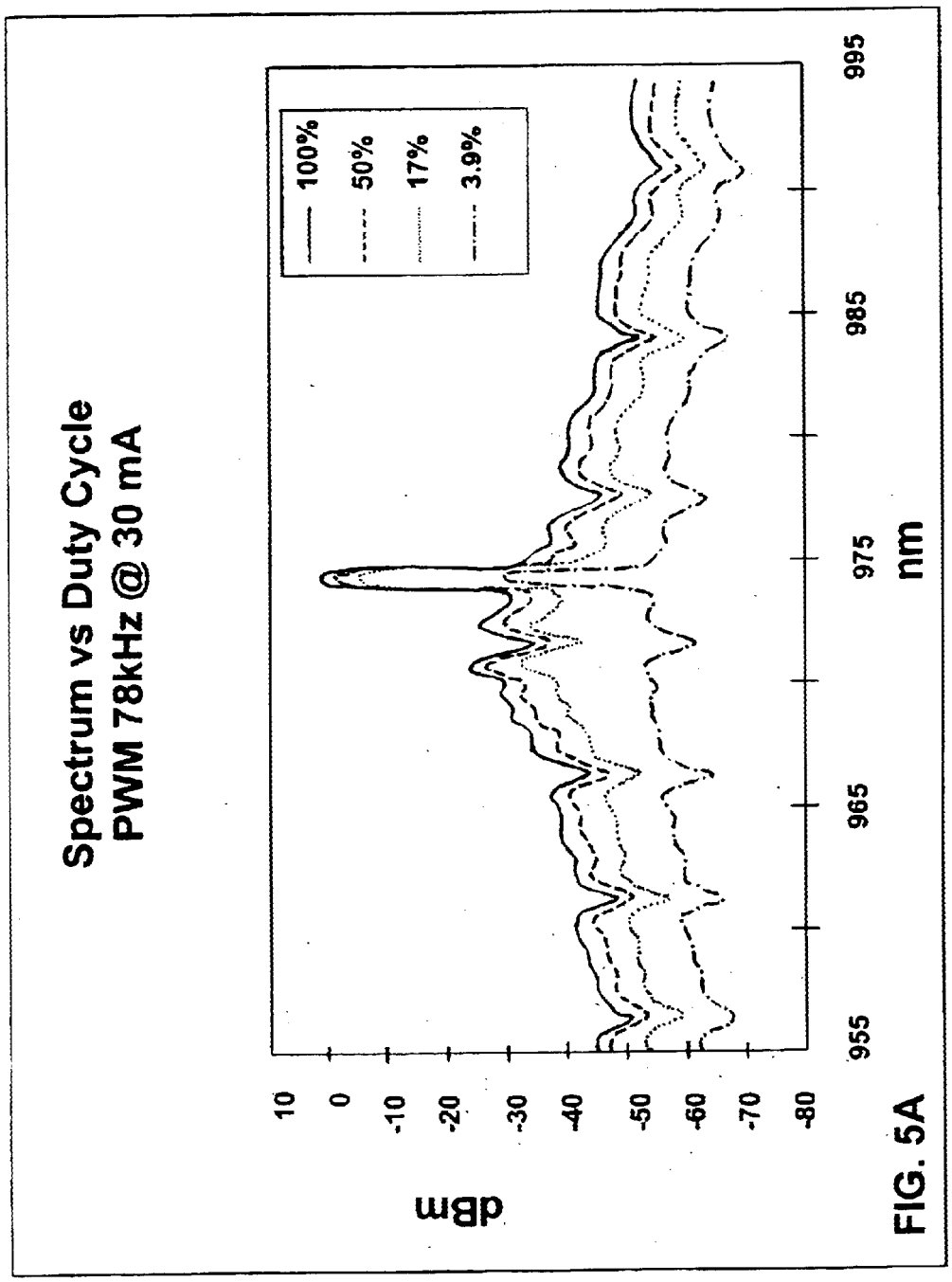
FIG. 5A is a graph of a spectrum of a pump laser modulated at a frequency of 78 kHz at 30 mA current at selected duty cycles.
Figure 5B:
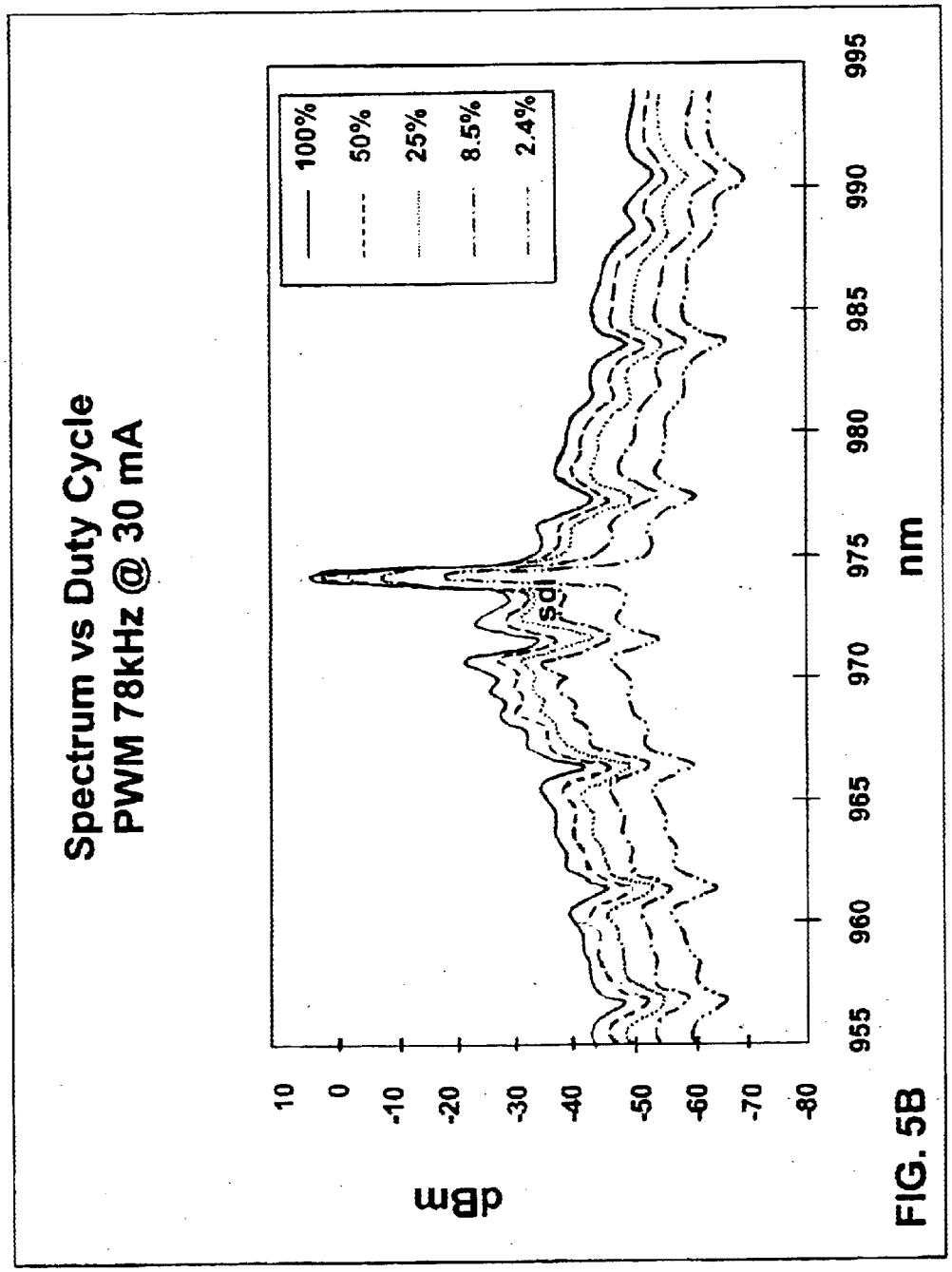
FIG. 5B is a graph of a spectrum of a pump laser modulated at a frequency of 78 kHz at 60 mA current at selected duty cycles.

Example data was obtained modulating the pulse rate at 78 kHz at power levels of 30 and 50 mA. FIGS. 5A and 5B illustrate power levels obtained at different duty cycles.

Figure 6:
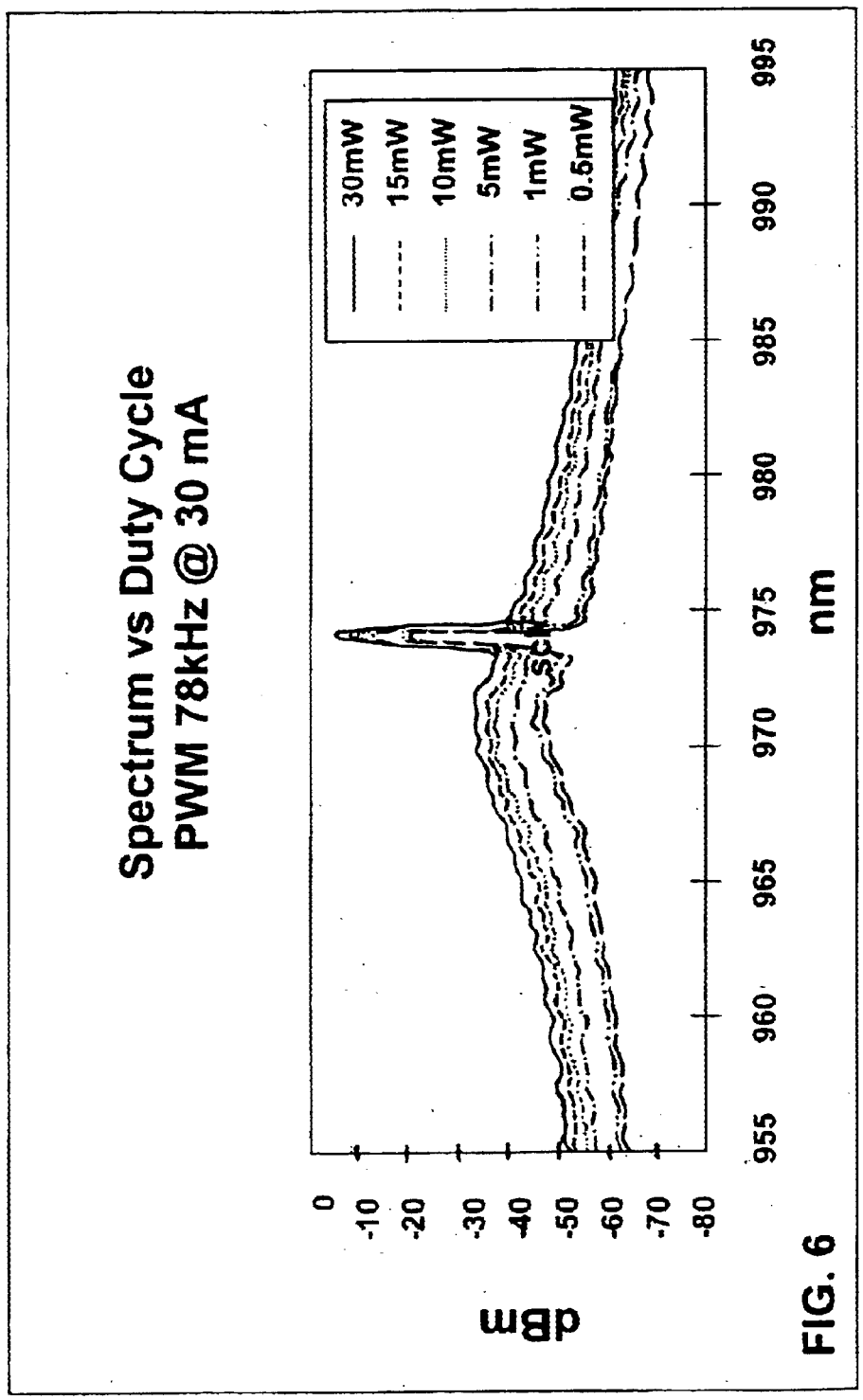
FIG. 6 is a graph of a spectrum of pump laser average output powers modulated at 156 kHz at 60 mA current.

For comparison FIG. 6 shows average power at a modulation rate at 156 kHz at 60 mA.

Figure 7:
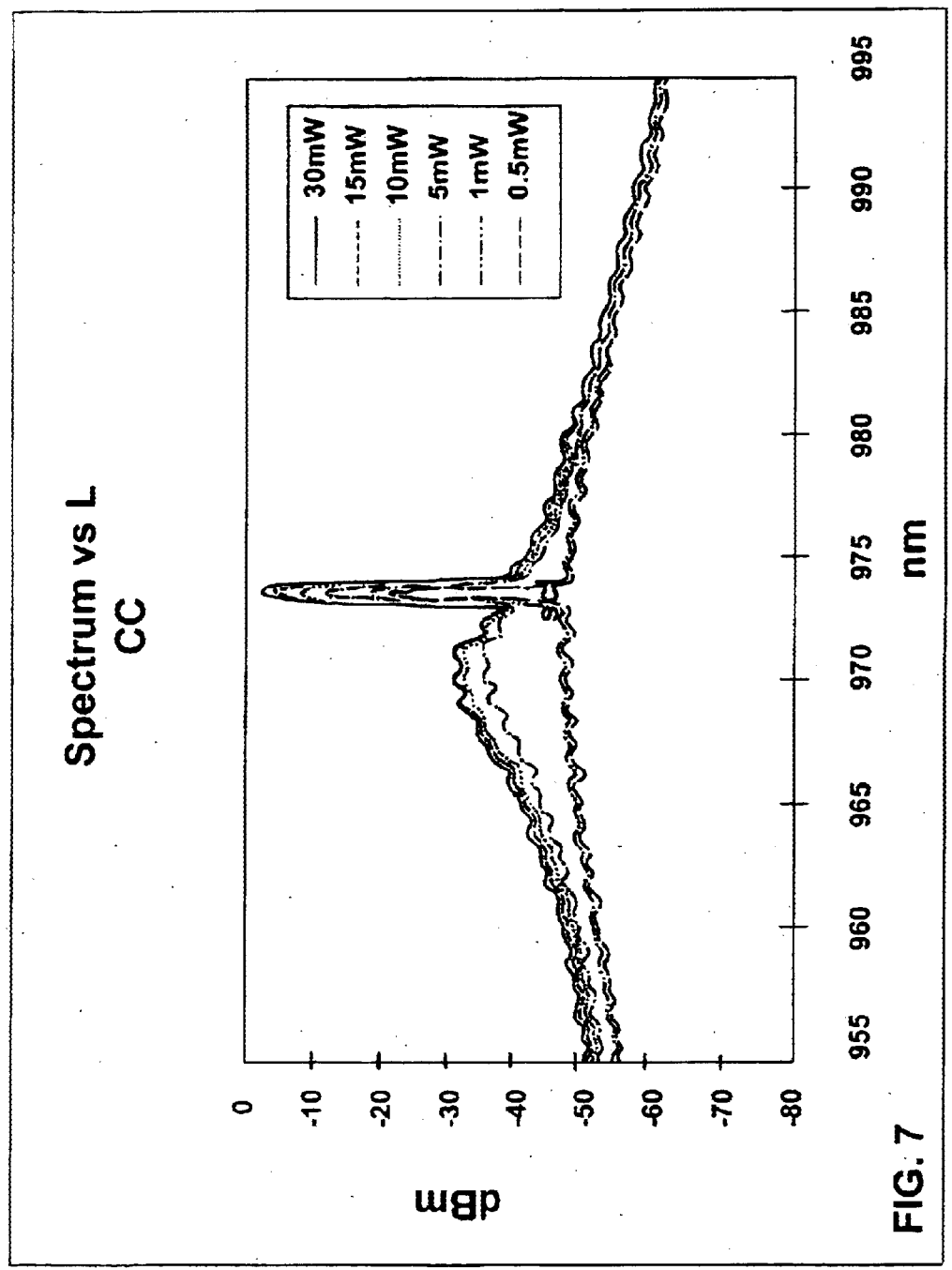
FIG. 7 is a graph of continuous wave laser output across a range of pump powers.

FIG. 7 shows a range of pump power levels operating at continuous wave.

Figure 8:
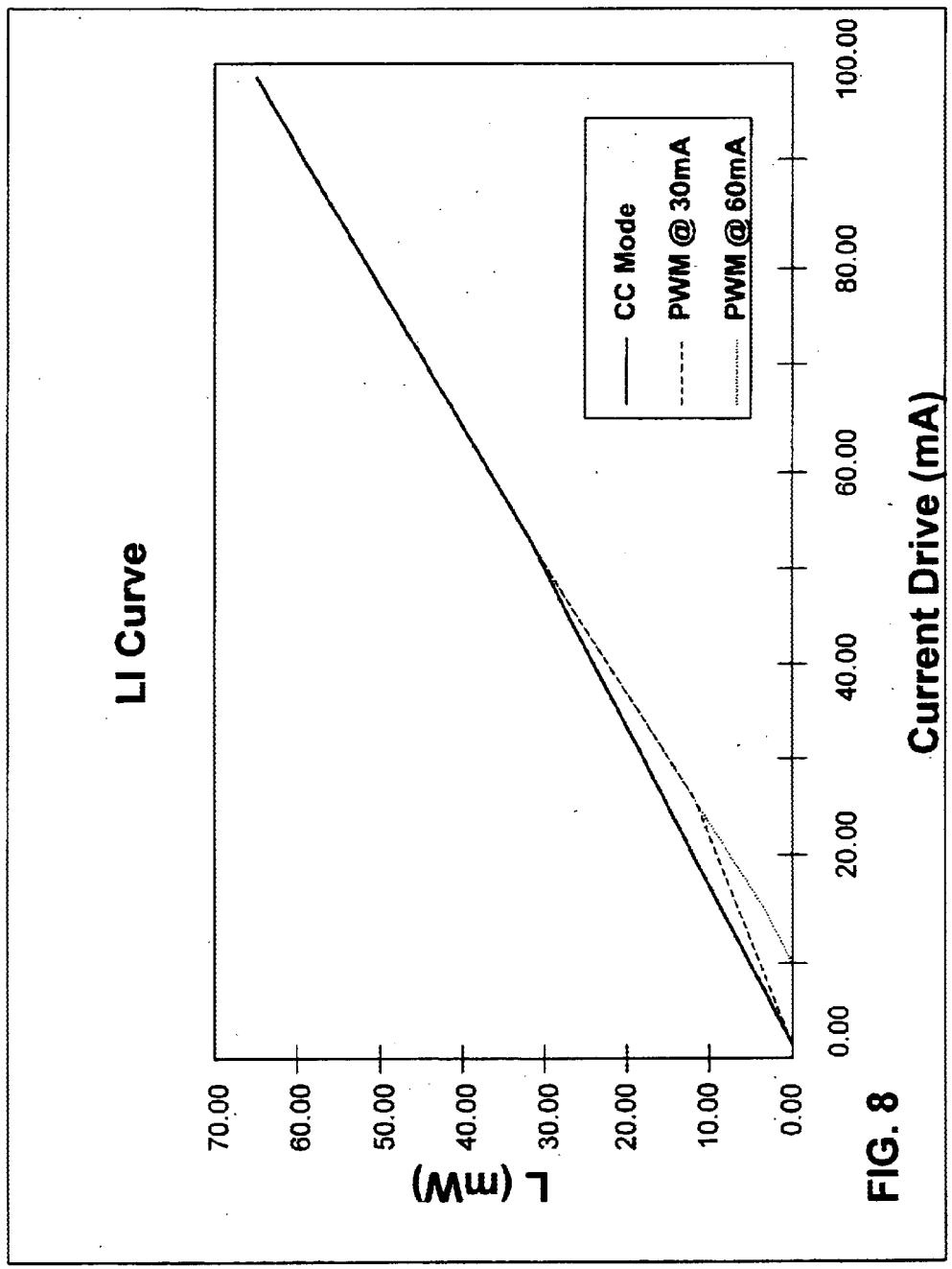
FIG. 8 is a graph of laser output versus drive current for continuous wave and PWM pump sources.

FIG. 8 shows LI curves for modulation from 30 mA, 60 mA and continuous wave. Time-averaged current levels between 0 and 10 mA are clearly obtained in the PWM method.

EDFAs are frequently pumped in a copropagating fashion using a low noise 980 nm pump and counter-propagating 1480 nm pump. When operating two pumps PWM can advantageously be driven with the modulation of each pump laser phase offset to the other, further reducing any gain ripple.

The method of the present invention is particularly suited to low power systems. This is not limited to WDM systems, as in fact, low power specifications for single wavelength amplifiers are more demanding.

The embodiment(s) of the invention described above is(are) intended to be exemplary only. The scope of the invention is therefore intended to be limited solely by the scope of the appended claims.

What is claimed is:

1. A method of operating a pump laser for a doped fiber amplifier over an extended dynamic range comprising the steps of:

determining a drive current Imax of the pump laser for maximum pump power output;

determining a drive current Imin of the pump laser for minimum stable pump output;

providing current to the pump laser to Imax;

decreasing current to the pump laser to decrease pump output substantially linearly to Imin;

applying pulsed current by pulse width modulation to the pump laser at least at Imin, establishing a variable pulsing duty cycle to provide substantially linear decrease in time averaged pump drive current to decrease pump output substantially linearly below the minimum stable pump output, such that a selected current between Imax and Imin and a selected pulse width modulation duty cycle at least at Imin provides a selected pump output power over a dynamic range greater than Imax-Imin.

2. An optical fiber amplifier having an extended range of dynamic gain comprising:

a doped gain medium for receiving and amplifying an optical signal;

a pump laser having an output wavelength absorbed in the gain medium for causing a population inversion in the gain medium, optically coupled to the gain medium;

a power supply for providing selectably variable current to the pump laser between a current level of Imax and Imin, wherein Imin corresponds to a minimum stable operating current;

means for pulsing the current to the pump laser on/off at least at Imin including means for varying the pulse duty cycle in order to provide selectable average current below Imin.

3. An amplifier as defined in claim 2, wherein the gain medium is erbium doped fiber.

4. An amplifier as defined in claim 3, wherein the pump laser comprises a semiconductor laser diode.

5. A pump laser source for a doped fiber amplifier comprising:

a pump laser having an output wavelength absorbed in the gain medium for causing a population inversion in the gain medium;

a power supply for providing selectably variable current to the pump laser between a current level of Imax and Imin, wherein Imin corresponds to a minimum stable operating current;

means for pulsing the current to the pump laser on/off at least at Imin including means for varying the pulse duty cycle in order to provide selectable average current below Imin.

* * * * *

UNITED STATES PATENT AND TRADEMARK OFFICE
CERTIFICATE OF CORRECTION

PATENT NO. : 6,760,152 B2
DATED : July 6, 2004
INVENTOR(S) : Ratoff et al.

It is certified that error appears in the above-identified patent and that said Letters Patent is hereby corrected as shown below:

Column 2,
Line 28, delete "Accordingly, the present invention provides".
Line 29, delete "Thus an aspect of the present invention provides".
Line 30, delete "In embodiments of the invention,".

Signed and Sealed this

Ninth Day of May, 2006

JON W. DUDAS
*Director of the United States Patent and Trademark Office*